(12) United States Patent
Tsai

(10) Patent No.: US 11,438,034 B2
(45) Date of Patent: Sep. 6, 2022

(54) APPARATUSES AND METHODS FOR A PHYSICAL RANDOM ACCESS CHANNEL (PRACH) RETRANSMISSION

(71) Applicant: MEDIATEK INC., Hsinchu (TW)

(72) Inventor: Chiou-Wei Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/991,200

(22) Filed: Aug. 12, 2020

(65) Prior Publication Data

US 2020/0373969 A1 Nov. 26, 2020

Related U.S. Application Data

(63) Continuation of application No. 15/977,071, filed on May 11, 2018, now Pat. No. 10,778,288.

(Continued)

(51) Int. Cl.
*H04B 7/0408* (2017.01)
*H04W 74/08* (2009.01)
(Continued)

(52) U.S. Cl.
CPC ......... *H04B 7/0408* (2013.01); *H04B 7/0617* (2013.01); *H04W 24/02* (2013.01); *H04W 74/0833* (2013.01)

(58) Field of Classification Search
CPC .. H04B 7/0408; H04B 7/0617; H04B 7/0695; H04B 7/088; H04W 24/02; H04W 74/0833

(Continued)

(56) References Cited

U.S. PATENT DOCUMENTS 9,661,592 B2   5/2017   Seol et al.
9,699,811 B2   7/2017   Nuggehalli et al.
(Continued)

FOREIGN PATENT DOCUMENTS

CN   101110622 A   1/2008
CN   104521312 A   4/2015
(Continued)

OTHER PUBLICATIONS

European Search Report dated Oct. 27, 2020, issued in application No. EP 18798251.7.

(Continued)

*Primary Examiner* — Kwang B Yao
*Assistant Examiner* — Syed M Bokhari
(74) *Attorney, Agent, or Firm* — McClure, Qualey & Rodack, LLP

(57) ABSTRACT

A method for a Physical Random Access Channel (PRACH) retransmission, executed by a UE wirelessly transmitting and receiving to and from a cellular station, operates by performing a first PRACH transmission or retransmission using a first spatial domain transmission filter on first PRACH resources which are associated with a first downlink reference signal. After the first PRACH transmission or retransmission, the method performs a second PRACH retransmission using a second spatial domain transmission filter on second PRACH resources which are associated with a second downlink reference signal. Finally, method operates without incrementing a power ramping counter in response to the UE selecting the second spatial domain transmission filter different from the first spatial domain transmission filter, or incrementing the power ramping counter in response to the UE selecting the second downlink reference signal different from the first downlink reference signal.

12 Claims, 5 Drawing Sheets

Related U.S. Application Data

(60) Provisional application No. 62/524,663, filed on Jun. 26, 2017, provisional application No. 62/505,150, filed on May 12, 2017.

(51) Int. Cl.
*H04W 24/02* (2009.01)
*H04B 7/06* (2006.01)

(58) Field of Classification Search
USPC .................................................. 370/329, 330
See application file for complete search history.

(56) References Cited

U.S. PATENT DOCUMENTS

| | | | |
|---|---|---|---|
| 2014/0016573 | A1 | 1/2014 | Nuggehalli et al. |
| 2014/0247796 | A1* | 9/2014 | Ouchi .................. H04L 5/0053 370/329 |
| 2015/0382205 | A1 | 12/2015 | Lee et al. |
| 2016/0219568 | A1 | 7/2016 | Pelletier et al. |
| 2016/0255591 | A1 | 9/2016 | Park et al. |
| 2016/0338067 | A1 | 11/2016 | Comstock |
| 2018/0098358 | A1 | 4/2018 | Rico Alvarino et al. |
| 2018/0324853 | A1 | 11/2018 | Jeon et al. |
| 2018/0359790 | A1* | 12/2018 | Ingale .................. H04W 28/16 |
| 2019/0182817 | A1* | 6/2019 | Agiwal .............. H04W 72/0406 |
| 2020/0146057 | A1* | 5/2020 | Jeon ..................... H04W 74/006 |
| 2020/0236712 | A1 | 7/2020 | Kwak et al. |

FOREIGN PATENT DOCUMENTS

| | | |
|---|---|---|
| CN | 105122900 A | 12/2015 |
| WO | 2016/086144 A1 | 6/2016 |
| WO | 2017/022870 A1 | 2/2017 |
| WO | 2017/023352 A1 | 2/2017 |
| WO | 2017/030601 A1 | 2/2017 |
| WO | 2017/052319 A1 | 3/2017 |
| WO | 2017/078465 A1 | 5/2017 |

OTHER PUBLICATIONS

European Search Report dated Dec. 10, 2020, issued in application No. EP 18798006.5.
"Discussion on 4-step Random Access Procedure for NR;" 3GPP TSG RAN WG1 AH_NR Meeting R1-1700614; Jan. 2017; pp. 1-7.
"Discussion on RACH Procedure;" 3GPP TSG RAN WG1 Meeting #88bis; Apr. 2017; pp. 1-7.
"Discussion on RACH Procedure;" 3GPP TSG RAN WG1 Meeting #89; May 2017; pp. 1-11.
Chinese language office action dated May 7, 2022, issued in application No. CN 201880003889.5.

* cited by examiner

APPARATUSES AND METHODS FOR A PHYSICAL RANDOM ACCESS CHANNEL (PRACH) RETRANSMISSION

CROSS REFERENCE TO RELATED APPLICATIONS

This Application is a Continuation of U.S. Ser. No. 15/977,071, filed on May 11, 2018, which claims priority of U.S. Provisional Application No. 62/505,150, filed on May 12, 2017, the entirety of which is incorporated by reference herein. Also, this Application claims priority of U.S. Provisional Application No. 62/524,663, filed on Jun. 26, 2017, the entirety of which is incorporated by reference herein.

BACKGROUND OF THE APPLICATION

Field of the Application

The application generally relates to Physical Random Access Channel (PRACH) designs and, more particularly, to apparatuses and methods for a PRACH retransmission.

Description of the Related Art

The fifth generation (5G) New Radio (NR) technology is an improvement over the fourth generation (4G) Long Term Evolution (LTE) technology, which provides extreme data speeds and capacity by utilizing higher, unlicensed spectrum bands (e.g., above 30 GHz, loosely known as millimeter Wave (mmWave)), for wireless broadband communications. Due to the huge path and penetration losses at millimeter wavelengths, a technique called "beamforming" is employed, and it assumes an important role in establishing and maintaining a robust communication link.

Beamforming generally requires one or more antenna arrays, each comprising a plurality of antennas. By appropriately setting antenna weights that define the contribution of each of the antennas to a transmission or reception operation, it becomes possible to shape the sensitivity of the transmission/reception to a particularly high value in a specific beamformed direction. By applying different antenna weights, different beam patterns can be achieved, e.g., different directive beams can be sequentially employed.

For a transmission (Tx) operation, beamforming may direct the signal towards a receiver of interest. Likewise, during a reception (Rx) operation, beamforming may provide a high sensitivity in receiving a signal originating from a sender of interest. Since transmission power may be anisotropically focused, e.g., into a solid angle of interest, beamforming may provide better link budgets due to lower required Tx power and higher received signal power, when compared to conventional practice, which does not employ beamforming and relies on more or less isotropic transmission.

For example, during a RACH procedure, a User Equipment (UE) may either apply beam switching or apply power ramping for a PRACH retransmission according to the 3GPP specifications for the 5G NR technology. For beam switching, the UE simply switches to a different Tx beam (or called a spatial domain transmission filter) to perform the PRACH retransmission, without increasing the transmission power. For power ramping, the UE increases the transmission power to perform the PRACH retransmission on the same Tx beam (i.e., using the same spatial domain transmission filter), causing the power ramping counter to be incremented by one.

BRIEF SUMMARY OF THE APPLICATION

In addition to beam switching and power ramping, the present application proposes to allow the UE to switch PRACH resources for a PRACH retransmission, so that power ramping may be applied less frequently and the interference on other UEs may be reduced.

In a first aspect of the application, a method for a Physical Random Access Channel (PRACH) retransmission, executed by a UE wirelessly transmitting and receiving to and from a cellular station, comprises: performing a first PRACH transmission or retransmission using a first spatial domain transmission filter on first PRACH resources which are associated with a first downlink reference signal; subsequent to the first PRACH transmission or retransmission, performing a second PRACH retransmission using a second spatial domain transmission filter on second PRACH resources which are associated with a second downlink reference signal; and not incrementing a power ramping counter in response to the UE selecting the second spatial domain transmission filter different from the first spatial domain transmission filter, or not incrementing the power ramping counter in response to the UE selecting the second downlink reference signal different from the first downlink reference signal.

In a second aspect of the application, a User Equipment (UE), comprises: a wireless transceiver, configured to perform wireless transmission and reception to and from a cellular station; and a controller, configured to perform a first PRACH transmission or retransmission using a first spatial domain transmission filter on first PRACH resources which are associated with a first downlink reference signal, and to perform a second PRACH retransmission subsequent to the first PRACH transmission or retransmission using a second spatial domain transmission filter on second PRACH resources which are associated with a second downlink reference signal, wherein the controller is further configured to not increment a power ramping counter in response to the second spatial domain transmission filter being different from the first spatial domain transmission filter or the second downlink reference signal being different from the first downlink reference signal.

Other aspects and features of the present application will become apparent to those with ordinarily skill in the art upon review of the following descriptions of specific embodiments of the UEs, cellular stations, and the methods for a PRACH retransmission.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
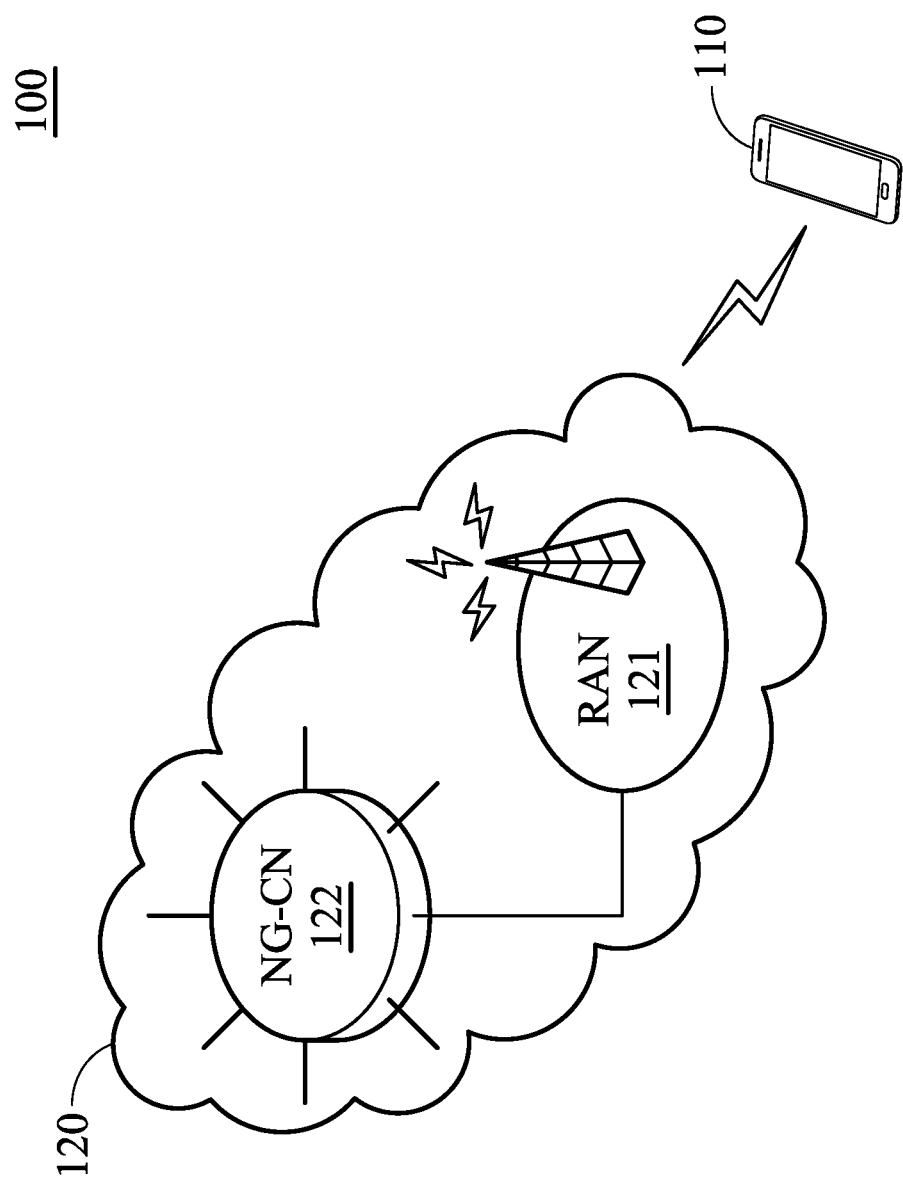
FIG. 1 is a block diagram of a wireless communication environment according to an embodiment of the application.

FIG. 1 is a block diagram of a wireless communication environment according to an embodiment of the application. The wireless communication environment 100 includes a User Equipment (UE) 110 and a 5G NR network 120, wherein the UE 110 is wirelessly connected to the 5G NR network 120.

The UE 110 may be a feature phone, a smartphone, a panel Personal Computer (PC), a laptop computer, or any wireless communication device supporting the cellular technology (i.e., the 5G NR technology) utilized by the 5G NR network 120. Particularly, the UE 110 employs the beamforming technique for wireless transmission and/or reception.

The 5G NR network 120 includes a Radio Access Network (RAN) 121 and a Next Generation Core Network (NG-CN) 122.

The RAN 121 is responsible for processing radio signals, terminating radio protocols, and connecting the UE 110 with the NG-CN 122. In addition, the RAN 121 is responsible for periodically broadcasting the minimum SI, and providing the other SI by periodic broadcasting or at the request of the UE 110. The RAN 121 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the 5G NR network 120 depicted in FIG. 1 is for illustrative purposes only and is not intended to limit the scope of the application. The application may also be applied to other cellular technologies, such as a future enhancement of the 5G NR technology.

Figure 2:
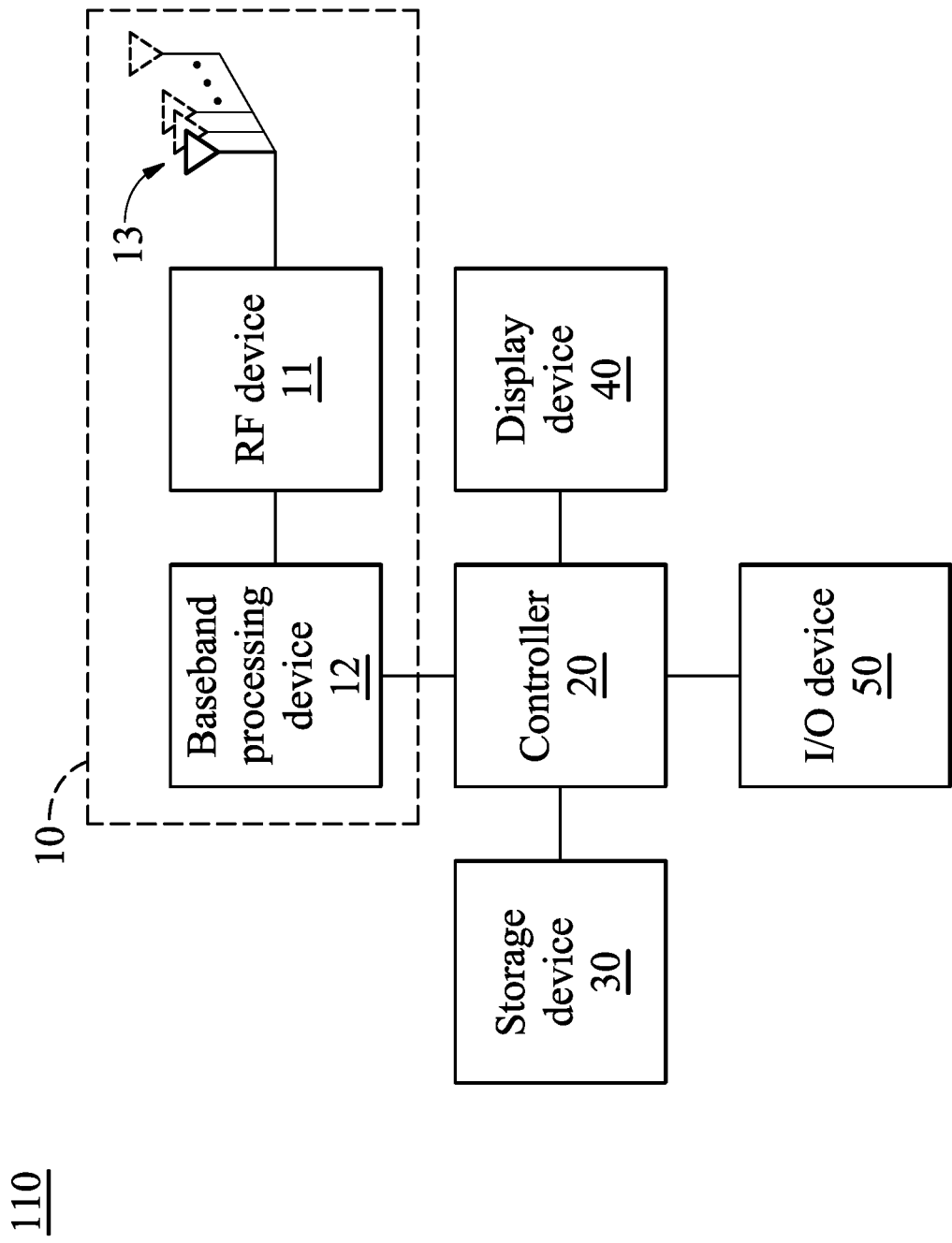
FIG. 2 is a block diagram illustrating the UE 110 according to an embodiment of the application.

FIG. 2 is a block diagram illustrating the UE 110 according to an embodiment of the application. The UE 110 includes a wireless transceiver 10, a controller 20, a storage device 30, a display device 40, and an Input/Output (I/O) device 50.

The wireless transceiver 10 is configured to perform wireless transmission and reception to and from the RAN 121. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or another radio frequency, depending on the cellular technology in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the RAN 121, storing and retrieving data (e.g., program code) to and from the storage device 30, sending a series of frame data (e.g. representing text messages, graphics, images, etc.) to the display device 40, and receiving/outputting signals from/to the I/O device 50. In particular, the controller 20 coordinates the aforementioned operations of the wireless transceiver 10, the storage device 30, the display device 40, and the I/O device 50 for performing the method for a PRACH retransmission.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the methods for a PRACH retransmission.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 3A:
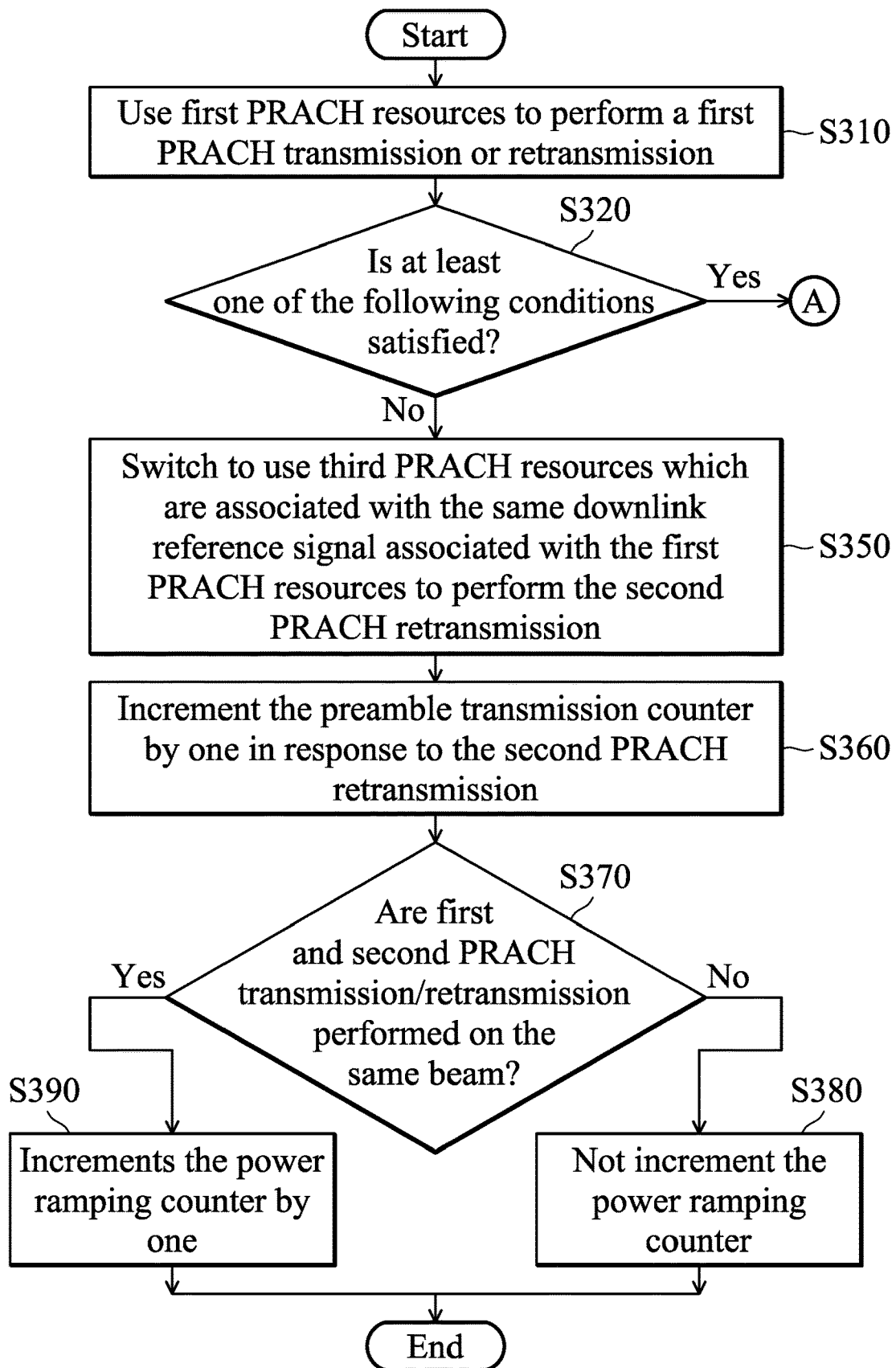
FIGS. 3A and 3B show a flow chart illustrating the method for a PRACH retransmission according to an embodiment of the application.
Figure 3B:
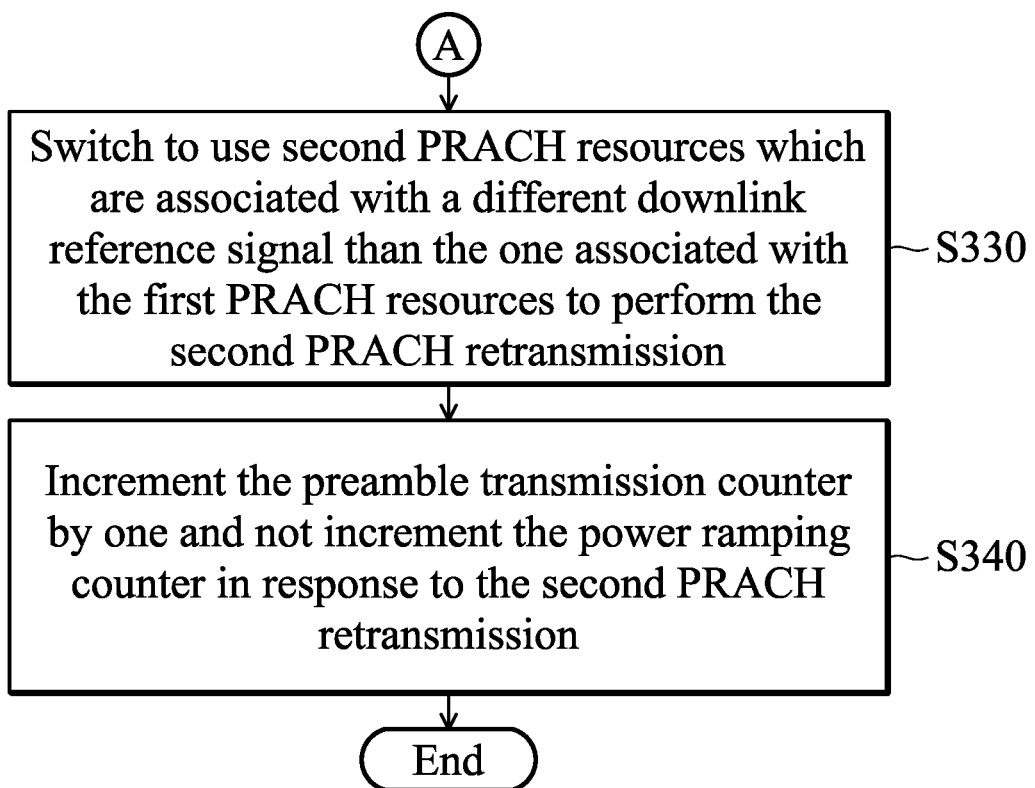

FIGS. 3A and 3B show a flow chart illustrating the method for a PRACH retransmission according to an embodiment of the application. In this embodiment, the method for a PRACH retransmission is applied to a UE (e.g., the UE 110) wirelessly connected to a cellular station (e.g., a gNB or TRP of the RAN 121), and the PRACH transmission/retransmission refers to transmission/retransmission of the message-1 (i.e., random access preamble) of a RACH procedure.

To begin, the UE uses first PRACH resources to perform a first PRACH transmission or retransmission (step S310). In one embodiment, the UE may initiate a RACH procedure by performing the first PRACH transmission. In another embodiment, the UE may perform the first PRACH retransmission during a RACH procedure.

Each of the first PRACH resources may include one or more PRACH preambles and/or one or more RACH occasions, wherein each RACH occasion refers to the time-frequency resource on which the message-1 of a RACH procedure is transmitted using the configured PRACH preamble format with a single particular Tx beam (or called a spatial domain transmission filter).

Next, for a second PRACH retransmission subsequent to the first PRACH transmission or retransmission, the UE determines whether at least one of the following conditions is satisfied (step S320).

Specifically, the conditions include: (1) the measurement result of the downlink reference signal associated with the first PRACH resources is better than the measurement result of the downlink reference signal associated with the second PRACH resources, wherein the downlink reference signal may include a Channel State Information-Reference Signal (CSI-RS), or a Synchronization Signal/Physical Broadcast Channel block (SSB); (2) the next occurrence of the second PRACH resources is closer to the current time than the next occurrence of the first PRACH resources (i.e., the second PRACH resources come earlier than the first PRACH resources); (3) the transmission power used for the first PRACH transmission or retransmission equals the maximum transmission power of the UE (which may be configured by the cellular station and/or by the UE), while the total number of PRACH transmissions or retransmissions has not reached the maximum transmission number configured by the cellular station; and (4) the Transmission Configuration Indication (TCI) state associated with the search space for monitoring a response to the first PRACH transmission or retransmission has been changed.

Subsequent to step S320, if at least one of the aforementioned conditions is satisfied, the UE switches to use second PRACH resources which are associated with a different downlink reference signal (e.g., a CSI-RS or SSB) than the one associated with the first PRACH resources to perform the second PRACH retransmission (step S330). Next, the UE increments the preamble transmission counter (i.e., PREAMBLE_TRANSMISSION_COUNTER in the 3GPP specification TS 38.321) by one and does not increment the power ramping counter (i.e., PREAMBLE_POWER_RAMPING_COUNTER in the 3GPP specification TS 38.321) in response to the second PRACH retransmission (step S340), and the method ends. That is, by switching to use PRACH resources associated with a different downlink reference signal than the one previously selected, the UE does not need to increase the transmission power for the second retransmission.

Please note that, in the present application, the association between the downlink reference signals and the PRACH resources is configured for indicating the downlink reference signal selected by UE to the cellular station when a PRACH preamble is transmitted by the UE and detected by the cellular station.

Subsequent to step S320, if none of the aforementioned conditions is satisfied, the UE switches to use third PRACH resources which are associated with the same downlink reference signal (e.g., a CSI-RS or SSB) associated with the first PRACH resources to perform the second PRACH retransmission (step S350). Next, the UE increments the preamble transmission counter by one in response to the second PRACH retransmission (step S360), and determines whether the first PRACH transmission or retransmission and the second PRACH retransmission are performed on the same beam or on different beams (i.e., using the same spatial domain transmission filter or different spatial domain transmission filters) (step S370).

Subsequent to step S370, if the first PRACH transmission or retransmission and the second PRACH retransmission are performed on different beams, the UE does not increment the power ramping counter (step S380). That is, by beam switching and PRACH resource switching (switching to use PRACH resources associated with the same downlink reference signal as the one previously selected), the UE does not need to increase the transmission power for the second retransmission. Otherwise, if the first PRACH transmission or retransmission and the second PRACH retransmission are performed on the same beam, the UE increments the power ramping counter by one (step S390), and the method ends. That is, despite switching to use PRACH resources associated with the same downlink reference signal as the one previously selected, the UE needs to increases the transmission power for the second retransmission since it stays on the same beam.

Likewise, each of the second and third PRACH resources may include one or more PRACH preambles and/or one or more RACH occasions, wherein each RACH occasion refers to the time-frequency resource on which the message-1 of a RACH procedure is transmitted using the configured PRACH preamble format with a single particular Tx beam (or called a spatial domain transmission filter).

Figure 4:
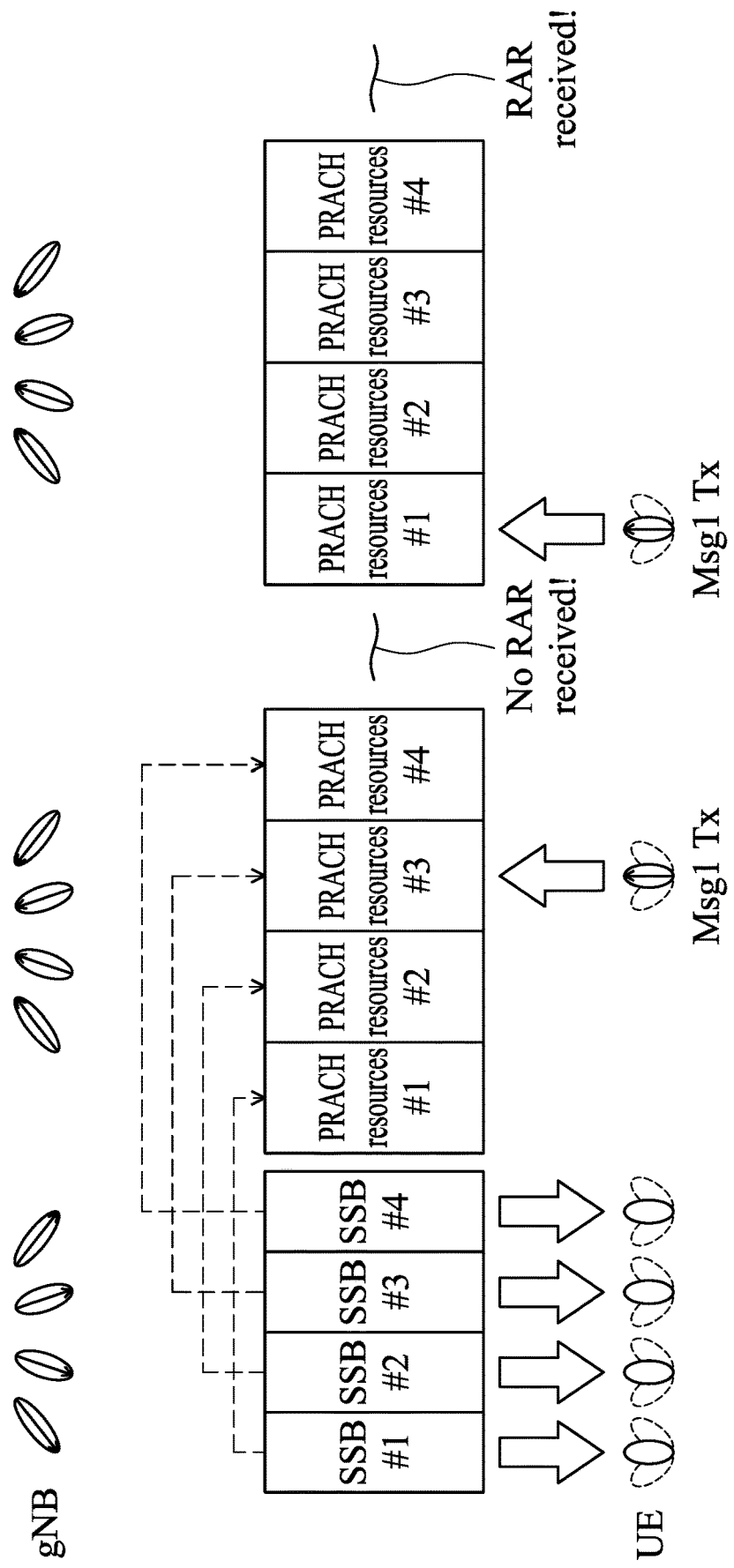
FIG. 4 is a schematic diagram illustrating switching PRACH resources for a PRACH retransmission according to an embodiment of the application.

FIG. 4 is a schematic diagram illustrating switching PRACH resources for a PRACH retransmission according to an embodiment of the application.

In this embodiment, there is an association between the downlink reference signals and the PRACH resources. For example, the first SSB is associated with the first PRACH resources, the second SSB is associated with the second PRACH resources, the third SSB is associated with the third PRACH resources, and the fourth SSB is associated with the fourth PRACH resources.

As shown in FIG. 4, during a RACH procedure, The UE uses the third PRACH resources to perform a PRACH transmission/retransmission (e.g., message-1 transmission) on a Tx beam (or called a spatial domain transmission filter), but no response (e.g., random access response) to the PRACH transmission/retransmission is received. Subsequently, the UE switches to use the first PRACH resources to perform a PRACH retransmission on the same Tx beam (i.e., using the same spatial domain transmission filter), and the RACH procedure ends when receiving a response to the PRACH retransmission.

In view of the forgoing embodiments, it will be appreciated that the present application provides an alternative for the UE to perform a PRACH retransmission. Besides the conventional options, such as beam switching and power ramping, the UE may switch PRACH resources to perform a PRACH retransmission. Advantageously, the power ramping may be applied less frequently and the interference on other UEs may be reduced. Also, the access latency for the UE may be reduced since the UE is allowed to switch PRACH resources during PRACH retransmissions.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method for a Physical Random Access Channel (PRACH) retransmission, executed by a UE wirelessly transmitting and receiving to and from a cellular station, the method comprising:
   performing a first PRACH transmission or retransmission using a first spatial domain transmission filter on first PRACH resources which are associated with a first downlink reference signal;
   subsequent to the first PRACH transmission or retransmission, performing a second PRACH retransmission using a second spatial domain transmission filter on second PRACH resources which are associated with a second downlink reference signal;
   not incrementing a power ramping counter in response to the UE selecting the second spatial domain transmission filter different from the first spatial domain transmission filter, or not incrementing the power ramping counter in response to the UE selecting the second downlink reference signal different from the first downlink reference signal; and
   incrementing the power ramping counter by one in response to the UE selecting the second spatial domain transmission filter to be the same as the first spatial domain transmission filter and the second downlink reference signal to be the same as the first downlink reference signal.

2. The method of claim 1, wherein each of the first PRACH resources and the second PRACH resources comprises one or more PRACH preambles, one or more RACH occasions, or a combination of the PRACH preambles and the RACH occasions.

3. The method of claim 1, wherein the downlink reference signal comprises a Channel State Information-Reference Signal (CSI-RS), a synchronization signal/physical broadcast channel (SS/PBCH) block.

4. The method of claim 1, further comprising: incrementing a preamble transmission counter by one no matter the second downlink reference signal is the same or different from the first downlink reference signal.

5. The method of claim 1, further comprising: incrementing a preamble transmission counter by one in response to the second PRACH retransmission.

6. The method of claim 1, wherein the step of selecting the second downlink reference signal different from the first downlink reference signal is performed under at least one of the following conditions:
   a measurement result of the second downlink reference signal is better than a measurement result of the first downlink reference signal;
   a next occurrence of the second PRACH resources associated with the second downlink reference signal is closer to the current time than a next occurrence of the first PRACH resources associated with the first downlink reference signal;
   a first transmission power used for the first PRACH transmission or retransmission equals a maximum transmission power of the UE, while a total number of PRACH transmissions or retransmissions has not reached a maximum transmission number configured by the cellular station; and
   a Transmission Configuration Indication (TCI) state associated with a search space for monitoring a response to the first PRACH transmission or retransmission has been changed.

7. A User Equipment (UE), comprising:
   a wireless transceiver, configured to perform wireless transmission and reception to and from a cellular station; and
   a controller, configured to perform a first PRACH transmission or retransmission using a first spatial domain transmission filter on first PRACH resources which are associated with a first downlink reference signal, and to perform a second PRACH retransmission subsequent to the first PRACH transmission or retransmission using a second spatial domain transmission filter on second PRACH resources which are associated with a second downlink reference signal,
   wherein the controller is further configured to not increment a power ramping counter in response to the second spatial domain transmission filter being different from the first spatial domain transmission filter or the second downlink reference signal being different from the first downlink reference signal, and wherein the controller is further configured to increment the power ramping counter by one in response to the second spatial domain transmission filter being the same as the first spatial domain transmission filter and the second downlink reference signal being the same as the first downlink reference signal.

8. The UE of claim 7, wherein each of the first PRACH resources and the second PRACH resources comprises one or more PRACH preambles, one or more RACH occasions, or a combination of the PRACH preambles and the RACH occasions.

9. The UE of claim 7, wherein the downlink reference signal comprises a Channel State Information-Reference Signal (CSI-RS), a synchronization signal/physical broadcast channel (SS/PBCH) block.

10. The UE of claim 7, wherein the controller is further configured to increment a preamble transmission counter by one no matter the second downlink reference signal is the same or different from the first downlink reference signal.

11. The UE of claim 7, wherein the controller is further configured to increment a preamble transmission counter by one in response to the second PRACH retransmission.

12. The UE of claim 7, wherein the controller selects the second downlink reference signal different from the first downlink reference signal under at least one of the following conditions:
   a measurement result of the second downlink reference signal is better than a measurement result of the first downlink reference signal;
   a next occurrence of the second PRACH resources associated with the second downlink reference signal is closer to the current time than a next occurrence of the first PRACH resources associated with the first downlink reference signal;
   a first transmission power used for the first PRACH transmission or retransmission equals a maximum transmission power of the UE, while a total number of PRACH transmissions or retransmissions has not reached a maximum transmission number configured by the cellular station; and
   a Transmission Configuration Indication (TCI) state associated with a search space for monitoring a response to the first PRACH transmission or retransmission has been changed.

* * * * *